US006268402B1

(12) United States Patent
Wilson et al.

(10) Patent No.: US 6,268,402 B1
(45) Date of Patent: *Jul. 31, 2001

(54) PROCESS FOR MAKING ISOCYANATE-BASED RIGID FOAM

(75) Inventors: Joe C. Wilson, Woodhaven; Jimmy L. Patterson, New Boston; James S. Dailey, Grosse Ile; Walter R. White, III, Trenton; Robert E. Riley, Flat Rock, all of MI (US)

(73) Assignee: BASF Corporation, Mt. Olive, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/245,211

(22) Filed: Feb. 5, 1999

(51) Int. Cl.$^7$ .................................................. C08G 18/14
(52) U.S. Cl. .................... 521/174; 521/114; 521/116; 521/117; 521/130; 521/131; 521/172; 521/173; 521/176
(58) Field of Search .................................... 521/114, 116, 521/117, 130, 131, 172, 173, 174, 176

(56) References Cited

U.S. PATENT DOCUMENTS 4,902,816 * 2/1990 McDaniel .............................. 521/175
5,922,779 * 7/1999 Hickey .................................. 521/114

* cited by examiner

Primary Examiner—John M. Cooney, Jr.
(74) Attorney, Agent, or Firm—Fernando A. Borrego

(57) ABSTRACT

A process for producing a rigid foam based on isocyanate comprises reacting an organic and/or modified organic polyisocyanate with a polyol composition and, optionally, a relatively low molecular weight chain extender or crosslinker in the presence of a catalyst, and, optionally, further auxiliaries and/or additives, wherein the polyol composition comprises a phthalic anhydride-initiated polyester polyol, a blowing agent comprising $C_4$–$C_6$ hydrocarbon, and a fatty acid or fatty alcohol ethoxylate compatibilizing agent. The blowing agent is soluble in the polyol composition, thereby reducing the risks associated with such blowing agents in processes for making rigid polymer foam articles and providing rigid foams having good dimensional stability and improved insulation properties.

19 Claims, No Drawings

PROCESS FOR MAKING ISOCYANATE-BASED RIGID FOAM

FIELD OF THE INVENTION

The present invention relates generally to a process for making isocyanate-based rigid foams from stable polyester polyol compositions comprising a phthalic anhydride-initiated polyester polyol, a $C_4$–$C_6$ hydrocarbon blowing agent, and a compatibilizing agent having an HLB of from about 7 to 12. The compatibilizing agent is a fatty acid or fatty alcohol ethoxylate. The blowing agent is soluble in the polyol composition. The process comprises reacting an organic polyisocyanate with the polyol composition in the presence of the blowing agent and other optional components. The process results in a rigid polyurethanelpolyisocyanurate foam which has improved dimensional stability and thermal insulation properties including improved K factors.

BACKGROUND OF THE INVENTION

Hydrocarbons are gaining wider acceptance as viable alternative blowing agents in the manufacture of rigid polyurethane foams. Due to the non-polar hydrophobic characteristic of hydrocarbons, they are only partially soluble, if not completely insoluble, in many polyols used to manufacture rigid polyurethane foams. The insolubility or poor shelf life of hydrocarbon-polyol mixtures has, to date, limited the ability of storing batches of the mixtures for use at a later time. Due to the poor solubility of hydrocarbons blowing agents in polyols, the blowing agent must be added to the polyol composition under constant agitation immediately before dispensing the foaming ingredients through a mixhead. The poor solubility of hydrocarbons also tends to lead to larger, coarser, or uneven cell structures in a resultant polyurethane foam. As is well known, the thermal conductivity of a foam generally increases with a poor cell structure. Therefore, it is critical that hydrocarbon be uniformly dispersed under constant agitation throughout the polyol mixture immediately prior to foaming in order to obtain a rigid polyurethane foam having the desired thermal insulation values.

In U.S. Pat. No. 5,391,317, Smits sought to manufacture a foam having both good dimensional stability and thermal insulation using hydrocarbons as blowing agents. This reference taught the use of a particular mixture of $C_{5-6}$ alicyclic alkanes, isopentane and n-pentane blowing agents in particular molar percents, in combination with a polyol mixture made up of an aromatic initiated polyether polyol, an aromatic polyester polyol, and a different amine-initiated polyether polyol. As the aromatic-initiated polyether polyol, Smits suggested using an alkylene oxide adduct of a phenolformaldehyde resin. The particular mixture of alicyclic and isomeric aliphatic alkane blowing agents is taught by Smits as producing a foam having good thermal insulation values.

The problem of obtaining a closed cell rigid polyurethane foam having both good dimensional stability and thermal insulation at low densities was also discussed in "An Insight Into The Characteristics of a Nucleation Catalyst I HCFC-Free Rigid Foam System" by Yoshimura et al. This publication reported the results of evaluations on a host of catalysts used in a standard polyurethane formulation to test the effects of each catalyst on the thermal insulation and dimensional stability of the foam. The standard formulation used contained 40 parts by weight of a sucrose-based polyether polyol, 30 parts by weight of an aromatic amine-initiated polyether polyol, and 30 parts by weight of an aliphatic amine-initiated polyether polyol, in a 1:1 weight ratio of aromatic to aliphatic amine-initiated polyols. This formulation was selected based upon the findings that sucrose and aromatic amine-based polyether polyols exhibited poor solubilities with cyclopentane, while aliphatic amine-based polyether polyols provided the best solubility for cyclopentane. As a result, 30 parts by weight of the aliphatic amine-initiated polyether polyol was used in the standard formulation.

Others have also tried to modify the polyol components in a polyol composition in an attempt to solubilize a hydrocarbon blowing agent in the polyol composition. In U.S. Pat. No. 5,547,998 (White et al), the level of aliphatic amine-initiated polyether polyols in a polyol composition is limited to solubilize cyclopentane in the polyol composition. When reacted with an organic isocyanate, the polyol composition, comprising an aromatic amine-initiated polyoxyalkylene polyether polyol and an aliphatic amine-initiated polyoxyalkylene polyether polyol in an amount of 10 weight percent or less by weight of the polyol composition produces a dimensionally stable rigid closed cell polyurethane foam having good thermal insulation properties.

In U.S. Pat. No. 5,648,019 (White et al), the level of aromatic polyester polyols in a polyol composition is preferably limited to 18 weight percent or less to improve the solubility of blowing agent in the polyol composition. The polyol composition is preferably reacted with an organic isocyanate to produce a rigid closed cell foam having good thermal insulation and dimensional stability.

Thus, it would be desirable to provide a polyester polyol composition which has a hydrocarbon blowing agent solubilized therein which can be used to produce dimensionally stable rigid polyurethane foam having good thermal insulation properties.

SUMMARY OF THE INVENTION

According to the present invention, a stable polyester polyol composition is provided comprising a phthalic anhydride-initiated polyester polyol, a $C_4$–$C_6$ hydrocarbon blowing agent, and a compatibilizing agent, wherein the blowing agent is soluble in the polyol composition. The compatibilizing agent comprises an oxyethylated fatty acid or fatty alcohol having an HLB of from about 7 to about 12, preferably from about 8 to about 11, most preferably about 10. In a preferred embodiment of the present invention, the compatibilizing agent is an oxyethylated fatty acid of the general formula $R_n$—COO(EO)$_x$H, wherein $R_n$ is a $C_{14}$ to $C_{26}$ alkyl chain, EO represents an ethylene oxide unit, and x is from about 5 to about 12. In one embodiment, the compatibilizing agent comprises a $C_{18}$–$C_{20}$ fatty acid-initiated oxyethylate having an average of about 8 ethylene oxide units per molecule. Preferably, the compatibilizing agent is present in an amount of from about 1.0 to about 25.0, more preferably 5.0 to about 15.0, most preferably 7.0 to about 10.0, parts by weight based on 100 parts by weight of the polyester polyol.

The blowing agents employed when used in association with the polyol compositions of the present invention have been found to offer lower densities, improved K factors, improved thermal insulation properties and improved dimensional stabilities over foams produced using other polyol systems. The compatibilizing agent preferably facilitates solubilizing the blowing agent in the polyol composition without sacrificing, and advantageously improving, the thermal insulation and dimensional stability of the resulting polyurethane foam. The blowing agent is preferably selected from the group of $C_5$ hydrocarbons, including isopentane, normal pentane, neopentane, cyclopentane and mixtures thereof. A preferred blowing agent mixture comprises a blend of isopentane and/or normal pentane and cyclopentane. In another embodiment of the present invention, the blowing agent comprises a blend of cyclopentane and isopentane, preferably in a weight ratio of about 70:30 to about 40:60. The amount of blowing agent present in the polyol composition is preferably at least about 5.0 parts by weight based on 100 parts by weight of the polyester polyol. In preferred embodiments of the invention, the amount of blowing agent in the polyol composition is from about 7 to about 30, more preferably from about 20 to about 30, most preferably from about 24 to about 27 parts by weight, based on 100 parts by weight of the polyester polyol.

There is also provided a polyisocyanate based rigid closed cell foam made by reacting an organic isocyanate with a polyol composition in the presence of a blowing agent, wherein the polyol composition comprises:

a) a phthalic anhydride-initiated polyester polyol, preferably having a hydroxyl number of 200 meq. polyol/g KOH or more, preferably in an amount of at least 50.0 percent by weight based on the weight of all polyol components in the polyol composition;

b) a blowing agent; and c) an oxyethylated fatty acid or fatty alcohol compatibilizing agent.

Again, the blowing agent comprises a $C_4$–$C_6$ hydrocarbon and is present in an amount of at least about 5.0 parts by weight, based on 100 parts by weight of the polyester polyol. By employing these constituents in the polyol composition, the blowing agent is soluble in the polyol composition. There is also provided a polyurethane foam comprising the reaction product of an organic isocyanate and a polyol composition containing the aforementioned blowing agent.

There is also provided a method of making a polyisocyanate based rigid closed cell foam comprising reacting an organic isocyanate with a phthalic anhydride initiated polyester polyol composition into which is incorporated a hydrocarbon blowing agent preferably in an amount of at least 5.0 parts by weight, based on 100 parts by weight of the polyester polyol. Preferably the polyester polyol has a hydroxyl number of 200 meq. polyol/g KOH or more. In another aspect of the invention, the polyester polyol is preferably present in the polyol composition in an amount at least 50.0 percent by weight, preferably at least 60.0 percent by weight, most preferably at least 75.0 percent by weight, based on the weight of all polyol components in the polyol composition. An oxyethylated fatty acid or fatty alcohol compatibilizing agent is preferably incorporated into the polyol composition.

DETAILED DESCRIPTION OF A PREFERRED EMBODIMENT

There is provided a storage stable polyol composition comprising a polyester polyol, a hydrocarbon blowing agent and a compatibilizing agent. A polyol composition is deemed "storage stable" or "soluble" when the polyol composition has the capacity of retaining the blowing agent in solution or in a dissolved state for a period of at least 5 days. The determination of whether or not the blowing agent is in solution or dissolved or soluble is measured by mixing the blowing agent with the polyol composition ingredients in a clear glass jar, capping the jar, vigorously agitating the contents in the jar and letting the contents remain still for 5 days at room temperature without agitation. If upon visual inspection there is no phase separation such that two discrete layers are formed, the blowing agent is deemed soluble in the polyol composition, and the polyol composition is deemed storage stable.

This test which lasts at least five days is only for purposes of measuring whether a particular polyol composition formulation is adequate to solubilize the blowing agent. As discussed further below, the blowing agent may be added to the polyol composition weeks prior to foaming, seconds prior to foaming, or right at the mix head. The scope of the invention includes each of these embodiments. By stating that the blowing agent is soluble in the polyol composition, it is meant that the polyol composition employed must be capable of maintaining a single phase product by visual inspection. In some cases, this may mean that a particular blowing agent forms a micro-emulsion with the polyol and other components. An important criteria is the uniform dispersal of the blowing agent during the foaming process as described herein.

Where it is said that the polyol composition "contains" a blowing agent or that the blowing agent is "dissolved in", "solubilized" or "in solution" with the polyol composition, this would include those embodiments where the blowing agent is mixed with the other polyol composition ingredients for a period of time sufficient to uniformly dissolve the blowing agent in the polyol composition prior to introducing the polyol composition into the mix head for reaction with an organic isocyanate compound, and would not include those embodiments where blowing agent is metered as a separate stream into a dispensing head or reaction with an organic isocyanate.

The polyol composition of the present invention contains a phthalic anhydride-initiated polyester polyol, a $C_4$–$C_6$ hydrocarbon blowing agent and a oxyethylated fatty acid or fatty alcohol compatibilizing agent having an HLB of from about 7 to about 12. Other ingredients that may be included in the polyol composition are other polyols, catalysts, surfactants, other blowing agents, flame retardants, fillers, stabilizers and other additives.

The polyester polyols useful in accordance with the teaching of the present invention include phthalic anhydride-initiated polyester polyols. Preferably, this polyester polyol has a hydroxyl number of at least 200 meq. polyol/g KOH. These polyester polyols provide improved dimensional stability to a rigid foam of the present invention. These phthalic anhydride-initiated polyester polyols are generally described in U.S. Pat. Nos. 4,644,048; 4,644,047; 4,644,027; 4,615,822; 4,608,432; 4,595,711; 4,529,744; and 4,521,611, the disclosures of which are incorporated herein by reference.

Particularly preferred polyester polyols of the present invention include STEPANPOL® PS2352, a phthalic anhydride-initiated polyester polyol commercially available from Stepan Chemical Company (Northfield, Ill.).

The overall amount of phthalic anhydride-initiated polyester polyol is preferably at least 50.0 weight percent, more preferably 60.0 weight percent, most preferably 75.0 weight percent based on the overall weight of all polyol components in the polyol composition. In one embodiment, the phthalic anhydride-initiated polyester polyol is the sole polyol component in the polyol composition. The polyol composition of the present invention may contain polyols other than the phthalic anhydride-initiated polyester polyol described above, e.g., other polyester polyols and polyether polyols including aromatic amine-initiated polyols and aliphatic amine-initiated polyols, for example.

The amount of additional polyols relative to the polyester polyol is not intended to be limited so long as the desired objective of manufacturing a dimensionally stable foam having good thermal insulation values, and optionally, but preferably solubilizing the blowing agent in the polyol composition can be achieved. In this regard, it should be understood that the predominant factors in formulating a stable polyol composition according to the present invention include the limited ability of the phthalic anhydride initiated polyester polyol to solubilize blowing agents and the limited ability of specific hydrocarbon blowing agents or blends thereof to blend into polyester polyols, particularly the phthalic anhydride-initiated polyester polyol. At the same time, one skilled in the art will appreciate that certain hydrocarbon blowing agents will provide distinct physical characteristics to an isocyanate-based foam, which characteristics must be taken into account when developing a polyester polyol composition or rigid foam. Under a preferred embodiment of the present invention the amount of additional polyols, including aromatic or aliphatic amine-initiated polyoxyalkylene polyether polyols and other polyester polyols, present in the polyol composition is less than about 20.0, more preferably less than about 15.0, most preferably less than about 10.0 percent by weight based on the weight of all polyol components in the polyol composition.

Suitable additional polyester polyols include those obtained, for example, from polycarboxylic acids and polyhydric alcohols. A suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, a-hydromuconic acid, β-hydromuconic acid, a-butyl-a-ethyl-glutaric acid, α,β-diethylsuccinic acid, isophthalic acid, terephthalic acid, phtalic acid, hemimellitic acid, and 1,4-cyclohexanedicarboxylic acid. A suitable polyhydric alcohol may be used such as ethylene glycol, propylene glycol, dipropylene glycol, trimethylene glycol, 1,2 butanediol, 1,5-pentanediol, 1,6-hexanediol, 1,7-heptanediol, hydroquinone, resorcinol glycerol, glycerine, 1,1,1-trimethylol-propane, 1,1,1-trimethylolethane, pentaerythritol, 1,2,6-hexanetriol, a-methyl glucoside, sucrose, and sorbitol. Also included within the term "polyhydric alcohol" are compounds derived from phenol such 2,2-bis(4-hydroxyphenol)-propane, commonly known as Bisphenol A. Preferred additional polyester polyols are aromatic polyester polyols.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Another suitable polyester polyol useful as an additional polyester polyol is an alpha-methylglucoside initiated polyester polyol derived from polyethylene terephthalate. This polyol has a molecular weight of approximately 358, a hydroxyl number of about 360 meq polyol/g KOH and a nominal average functionality of 2.3.

As alluded to above, each of the polyols, including the polyester polyol, preferably have hydroxyl numbers of 200 or more meq polyol/g KOH. At hydroxyl numbers of less than 200, the dimensional stability of the foam may begin to deteriorate. The optimum nominal functionality of aromatic polyester polyol appears to be 2 or more, with an average hydroxyl numbers of 350 or more. Likewise, the optimum nominal functionality of each amine-initiated polyol appears to be 4 or more, with hydroxyl numbers of 400 or more.

Other polyols besides the polyester polyols described herein can be added to the polyol composition provided the desired objectives discussed above can be achieved. Such polyols would include polyoxyalkylene polyether polyols, polythioether polyols, polyester amides and polyacetals containing hydroxyl groups, aliphatic polycarbonates containing hydroxyl groups, amine terminated polyoxyalkylene polyethers, polyester polyols, other polyoxyalkylene polyether polyols, and graft dispersion polyols. In addition, mixtures of at least two of the aforesaid polyols can be used. The preferable additional polyols are polyoxyalkylene polyether polyols; however, the total amount of additional polyols employed will preferably not exceed 20.0 weight percent based on the total weight of all polyol components in the polyol composition.

Included among polyoxyalkylene polyether polyols are polyoxyethylene polyols, polyoxypropylene polyols, polyoxybutylene polyols, polytetramethylene polyols, and block copolymers, for example combinations of polyoxypropylene and polyoxyethylene poly-1,2-oxybutylene and polyoxyethylene polyols, poly-1,4-tetramethylene and polyoxyethylene polyols, and copolymer polyols prepared from blends or sequential addition of two or more alkylene oxides. The polyoxyalkylene polyether polyols may be prepared by any known process such as, for example, the process disclosed by Wurtz in 1859 and Encyclopedia of Chemical Technology,Vol. 7, pp. 257–262, published by lnterscience Publishers, Inc. (1951) or in U.S. Pat. No. 1,922,459. The alkylene oxides may be added to the initiator, individually, sequentially one after the other to form blocks, or in mixture to form a heteric polyether. The polyoxyalkylene polyether polyols may have either primary or secondary hydroxyl groups.

The polyoxyalkylene polyether polyol may have aromatic amine-initiated or aliphatic amine-initiated polyoxyalkylene polyether polyols. It is preferred that at least one of the amine-initiated polyols are polyether polyols terminated with a secondary hydroxyl group through addition of, for example, propylene oxide as the terminal block. It is preferred that the amine-initiated polyols contain 50 weight percent or more, and up to 100 weight percent, of secondary hydroxyl group forming alkylene oxides, such as polyoxypropylene groups, based on the weight of all oxyalkylene groups. This amount can be measured by adding 50 weight percent or more of the secondary hydroxyl group forming alkylene oxides to the initiator molecule in the course of manufacturing the polyol.

Suitable initiator molecules for the polyoxyalkylene polyether compounds are primary or secondary amines. These would include, for the aromatic amine-initiated polyether polyol, the aromatic amines such as aniline, N-alkylphenylene-diamines, 2,4'-, 2,2'-, and 4,4'-methylenedianiline, 2,6- or 2,4-toluenediamine, vicinal toluenediamines, o-chloro-aniline, p-aminoaniline, 1,5-diaminonaphthalene, methylene dianiline, the various condensation products of aniline and formaldehyde, and the isomeric diaminotoluenes, with preference given to vicinal toluenediamines.

For the aliphatic amine-initiated polyol, any aliphatic amine, whether branched or unbranched, substituted or unsubstituted, saturated or unsaturated, may be used. These would include, as examples, mono-, di, and trialkanolamines, such as monoethanolamine, methylamine, triisopropanolamine; and polyamines such as ethylene diamine, propylene diamine, diethylenetriamine; or 1,3-diaminopropane, 1,3-diaminobutane, and 1,4-diaminobutane. Preferable aliphatic amines include any of the diamines and triamines, most preferably, the diamines.

Preferably, the additional polyols have number average molecular weights of 200–750 and nominal functionalities of 3 or more. By a nominal functionality, it is meant that the functionality expected is based upon the functionality of the initiator molecule, rather than the actual functionality of the final polyether after manufacture.

The polyoxyalkylene polyether polyols are polyoxyalkylene polyether polyols. These polyols may generally be prepared by polymerizing alkylene oxides with polyhydric amines. Any suitable alkylene oxide may be used such as ethylene oxide, propylene oxide, butylene oxide, amylene oxide, and mixtures of these oxides. The polyoxyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide.

Other polyoxyalkylene polyether polyols may include those initiated with polyhydroxyl compounds. Examples of such initiators are trimethylolpropane, glycerine, sucrose, sorbitol, propylene glycol, dipropylene glycol, pentaerythritol, and 2,2-bis(4-hydroxyphenyl)-propane and blends thereof. The preferred polyols are initiated with polyhydroxyl compounds having at least 4 sites reactive with alkylene oxides, and further may be oxyalkylated solely with propylene oxide. In a more preferred embodiment, the additional polyol is a polyoxyalkylene polyether polyol having a nominal functionality of 5 or more, that may be initiated with a polyhydroxyl compound. The high functionality serves to increase the crosslink density to provide a dimensionally stable foam.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thio-ether polyol.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction produce of formaldehyde or other suitable aldehyde with a dihydric alcohol or an alkylene oxide such as those disclosed above.

Suitable aliphatic thiols which may be condensed with alkylene oxides include alkanethiols containing at least two —SH groups such as 1,2-ethanedithiol, 1,2-propanedithiol, 1,2-propanedithiol, and 1,6-hexanedithiol; alkene thiols such as 2-butane-1,4-dithiol; and alkene thiols such as 3-hexene-1,6-dithiol.

Also suitable are polymer modified polyols, in particular, the so-called graft polyols. Graft polyols are well known to the art and are prepared by the in situ polymerization of one or more vinyl monomers, preferably acrylonitrile and styrene, in the presence of a polyether polyol, particularly polyols containing a minor amount of natural or induced unsaturation. Methods of preparing such graft polyols may be found in columns 1–5 and in the Examples of U.S. Pat. No. 3,652,639; in columns 1–6 and the Examples of U.S. Pat. No. 3,823,201; particularly in columns 2–8 and the Examples of U.S. Pat. No. 4,690,956; and in U.S. Pat. No. 4,524,157; all of which patents are herein incorporated by reference.

Non-graft polymer modified polyols are also suitable, for example, as those prepared by the reaction of a polyisocyanate with an alkanolamine in the presence of a polyether polyol as taught by U.S. Pat. Nos. 4,293,470; 4,296,213; and 4,374,209; dispersions of polyisocyanurates containing pendant urea groups as taught by U.S. Pat. No. 4,386,167; and polyisocyanurate dispersions also containing biuret linkages as taught by U.S. Pat. No. 4,359,541. Other polymer modified polyols may be prepared by the in situ size reduction of polymers until the particle size is less than 20 mm, preferably less than 10 mm.

The average hydroxyl number of the polyols in the polyol composition should preferably be 200 meq polyol/g KOH or more and, more preferably 350 meq polyol/g KOH or more. Individual polyols may be used which fall below the lower limit, but the average should be within this range. Polyol compositions whose polyols are on average within this range make good dimensionally stable foams.

In addition to the foregoing, the polyester polyol composition of the present invention also includes a blowing agent selected from the group consisting of $C_4$–$C_6$ hydrocarbons and mixtures thereof. The blowing agent may be added and solubilized in the polyol composition for storage and later use in a foaming apparatus or may be added to a preblend tank in the foaming apparatus and preferably solubilized in the polyol composition immediately prior to pumping or metering the foaming ingredients to the mix head. Alternatively, the blowing agent may be added to the foaming ingredients in the mix head as a separate stream, although full solubility might be limited due to the short amount of time the blowing agent is exposed to the polyol composition in the mix head. The advantage of the polyol composition of the invention is that the polyol composition provides the flexibility of storing stable polyol compositions containing the desired blowing agent, or solubilizing the blowing agent with the polyol composition in the preblend tank, or adding it at the mix head, to manufacture a foam of the desired quality. The polyol composition of the invention is specially adapted to enable a variety of blowing agents to be employed to produce rigid closed cell polyisocyanate based foams meeting the desired objectives.

The amount of blowing agent used is preferably 5.0 parts by weight or more based on 100 parts by weight of the polyester polyol in the polyol composition. The particular amount of blowing agent will depend in large part upon the desired density of the foam product. For most applications, polyurethane free rise densities for thermal insulation applications range from free rise densities of 0.5 to 10 pcf, preferably from 1.2 to 2.5 pcf. The preferred overall densities of foams packed to 10% by weight, meaning the percentage by weight of foam ingredients above the theoretical amount needed to fill the volume of the mold upon foaming, are from about 1.2 to about 2.5 pcf, more preferably from 1.3 to 2.0 pcf. The amount by weight of all blowing agents is generally, based on the weight of the polyol composition, from about 5.0 parts by weight to 40.0 parts by weight, and more preferably, 7.0 parts by weight to 30.0 parts by weight, most preferably from about 20.0 to about 30.0 parts by weight, based on 100 parts by weight of the polyester polyol. In one embodiment herein, the blowing agent is present in an amount of from about 24.0 to about 27.0 parts by weight, based on 100 parts by weight of the polyester polyol.

The blowing agents useful in the polyol composition of the present invention are selected from the group consisting $C_4$–$C_6$ hydrocarbons and mixtures thereof. The hydrocarbons are preferably the sole blowing agent, optionally with water. Thus, such blowing agents include butanes, pentanes, hexanes, and mixtures thereof. Such blowing agents may be linear, unbranched or cyclic in chemical structure. Preferred blowing agents are the pentanes, i.e., isopentane, normal pentane, cyclopentane and neopentane. The pentanes may be incorporated into the polyol composition of the present invention alone or as a blend of two or more thereof. In one embodiment of the present invention, the blowing agent comprises a mixture of cyclopentane and isopentane, which preferably has a weight ratio of between about 70:30 and 40:60. Furthermore, mixtures of normal pentane with isopentane and/or cyclopentane are also preferred. Blowing agents comprising isopentane and cyclopentane provide excellent dimensional stability and insulation properties to a rigid foam of the present invention. Generally, the selection of the blowing agent utilized will depend on the desired physical characteristics of the polyurethane foam. Those skilled in the art are familiar with the effects provided by the blowing agents of the present invention.

The hydrocarbon blowing agents of the present invention are generally available from manufacturers of fractional distillation products from petroleum, including Phillips Petroleum and Exxon Corporation. One known method of producing a high purity cyclopentane blowing agent is disclosed in U.S. Pat. No. 5,578,652 (Blanpied et al).

The above hydrocarbons may be used as the sole blowing agent in the present invention. However, additional limited amounts of auxiliary blowing agents may be used, including HFC's and HCFC's. Suitable hydrofluorocarbons, perfluorinated hydrocarbons, and fluorinated ethers (collectively referred to herein as HFC's) which are useful as additional blowing agents include difluoromethane (HFC-32); 1,1,1,2-tetrafluoroethane (HFC-134a); 1,1,2,2-tetrafluoroethane (HFC-134); 1,1-difluoroethane (HFC-152a); 1,2-difluoroethane (HFC-142), trifluoromethane; heptafluoropropane; 1,1,1-trifluoroethane; 1,1,2-trifluoroethane; 1,1,1,2,2-pentafluoropropane; 1,1,1,3,3-pentafluoropropane (HFC 245fa); 1,1,1,3-tetrafluoropropane; 1,1,2,3,3-pentafluoropropane; 1,1,1,3,3-pentafluoro-n-butane; 1,1,1,2,3,3,3-heptafluoropropane (HFC 227ea); hexafluorocyclopropane (C-216); octafluorocyclobutane (C-318); perfluorotetrahydrofuran; perfluoroalkyl tetrahydrofurans; perfluorofuran; perfluoro-propane, -butane, -cyclobutane, -pentane, -cyclopentane, and -hexane, -cyclohexane, -heptane, and -octane; perfluorodiethyl ether; perfluorodipropyl ether; and perfluoroethyl propyl ether. Preferred among the HFC blowing agents are HFC 134a and HFC 236ea, respectively.

Suitable hydrochlorofluorocarbon blowing agents which may also be used as additional blowing agents are 1-chloro-1,2-difluoroethane; 1-chloro-2,2-difluoroethane (142a); 1-chloro-1,1-difluoroethane (142b); 1,1-dichloro-1-fluoroethane (141b); 1-chloro-1,1,2-trifluoroethane; 1-chloro-1,2,2-trifluoroethane; 1,1-diochloro-1,2-difluoroethane; 1-chloro-1,1,2,2-tetrafluoroethane (124a); 1-chloro-1,2,2,2-tetrafluoroethane (124); 1,1-dichloro-1,2,2-trifluoroethane; 1,1-dichloro-2,2,2-trifluoroethane (123); and 1,2-dichloro-1,1,2-trifluoroethane (123a); monochlorodifluoromethane (HCFC-22); 1-chloro-2,2,2-trifluoroethane (HCFC-133a); gem-chlorofluoroethylene (R-1131a); chloroheptafluoropropane (HCFC-217); chlorodifluoroethylene (HCFC-1122); and trans-chlorofluoroethylene (HCFC-1131). Preferred among hydrochlorofluorocarbon blowing agents is 1,1-dichloro-1-fluoroethane (HCFC-141b).

Other blowing agents which can be used in addition to the blowing agents listed above may be divided into the chemically active blowing agents which chemically react with the isocyanate or with other formulation ingredients to release a gas for foaming, and the physically active blowing agents which are gaseous at the exothermic foaming temperatures or less without the necessity for chemically reacting with the foam ingredients to provide a blowing gas. Included within the meaning of physically active blowing agents are those gases which are thermally unstable and decompose at elevated temperatures.

Examples of chemically active blowing agents are preferentially those which react with the isocyanate to liberate gas, such as $CO_2$. Suitable chemically active blowing agents include, but are not limited to, water, mono- and polycarboxylic acids having a molecular weight of from 46 to 300, salts of these acids, and tertiary alcohols.

Water is preferentially used as a blowing agent. Water reacts with the organic isocyanate to liberate $CO_2$ gas which is the actual blowing agent. However, since water consumes isocyanate groups, an equivalent molar excess of isocyanate must be used to make up for the consumed isocyanates. Water is typically found in minor quantities in the polyols as a byproduct and may be sufficient to provide the desired blowing from a chemically active substance. Preferably, however, water is additionally introduced into the polyol composition in amounts of from about 0.02 to 5 weight percent, preferably from 0.05 to 4 parts by weight, based on 100 parts by weight of the polyester polyol.

The organic carboxylic acids used are advantageously aliphatic mono- and polycarboxylic acids, e.g. dicarboxylic acids. However, other organic mono- and polycarboxylic acids are also suitable. The organic carboxylic acids may, if desired, also contain substituents which are inert under the reaction conditions of the polyisocyanate polyaddition or are reactive with isocyanate, and/or may contain olefinically unsaturated groups. Specific examples of chemically inert substituents are halogen atoms, such as fluorine and/or chlorine, and alkyl, e.g. methyl or ethyl. The substituted organic carboxylic acids expediently contain at least one further group which is reactive toward isocyanates, e.g. a mercapto group, a primary and/or secondary amino group, or preferably a primary and/or secondary hydroxyl group.

Suitable carboxylic acids are thus substituted or unsubstituted monocarboxylic acids, e.g. formic acid, acetic acid, propionic acid, 2-chloropropionic acid, 3-chloropropionic acid, 2,2-dichloropropionic acid, hexanoic acid, 2-ethylhexanoic acid, cyclohexanecarboxylic acid, dodecanoic acid, palmitic acid, stearic acid, oleic acid, 3-mercaptopropionic acid, glycolic acid, 3-hydroxypropionic acid, lactic acid, ricinoleic acid, 2-aminopropionic acid, benzoic acid, 4-methylbenzoic acid, salicylic acid and anthranilic acid, and unsubstituted or substituted polycarboxylic acids, preferably dicarboxylic acids, e.g. oxalic acid, malonic acid, succinic acid, fumaric acid, maleic acid, glutaric acid, adipic acid, sebacic acid, dodecanedoic acid, tartaric acid, phthalic acid, isophthalic acid and citric acid. Preferable acids are formic acid, propionic acid, acetic acid, and 2-ethylhexanoic acid, particularly formic acid.

The amine salts are usually formed using tertiary amines, e.g. triethylamine, dimethylbenzylamine, diethylbenzylamine, triethylenediamine, or hydrazine. Tertiary amine salts of formic acid may be employed as chemically active blowing agents which will react with the organic isocyanate. The salts may be added as such or formed in situ by reaction between any tertiary amine (catalyst or polyol) and formic acid contained in the polyol composition.

Combinations of any of the aforementioned chemically active blowing agents may be employed, such as formic acid, salts of formic acid, and/or water.

Decomposition type physically active blowing agents that release a gas through thermal decomposition include pecan flour, amine/carbon dioxide complexes, and alkyl alkanoate compounds especially methyl and ethyl formates.

Generally, the blowing agents of the present invention pose particular problems in incorporation into polyester polyol compositions, particularly phthalic-anhydride-initiated polyester polyols of the present invention. It is preferred to have the hydrocarbon blowing agent solubilized or dissolved in the polyol composition to avoid problems of separation of the hydrocarbon and polyol component and accumulation of the hydrocarbon blowing agent in the head space. There is particular concern with the hydrocarbon blowing agents concerning an explosion hazard.

Thus, the polyol composition of the present invention further comprises an oxyethylated fatty acid or fatty alcohol compatibilizing agent which has an HLB of from about 7 to 12 preferably from about 8 to about 11, most preferably from about 8 to about 10.5. This compatibilizing agent facilitates the incorporation of the hydrocarbon blowing agents into the polyol composition by solubilizing this blowing agent into the polyol composition. The compatibilizing agent appears to reduce the percentage of gas loss during the foaming process when the hydrocarbon blowing agents of the present invention are utilized. Suitable compatibilizing agents include the oxyethylated fatty alcohols having an HLB of from about 7 to 12, preferably from about 8 to about 12, most preferably from about 8 to about 11.5. Such oxyethylated fatty alcohols preferably have an alkyl chain portion having from about 10 to about 20 carbons. One such oxyethylated fatty alcohol is ICONOL® DA-4 commercially available from BASF Corporation (Mt. Olive, N.J.), which has an average $C_{10}$ alkyl chain portion, on average four EO units per molecule and has an HLB of 10.5. Another such oxyethylated fatty alcohol is ICONOL® TDA-3 commercially available from BASF Corporation, which has an average $C_{13}$ alcohol chain portion, an average three EO units per molecule, and has an HLB of about 8.

Other suitable compatibilizing agents include oxyethlyated fatty acids of the general formula $R_n$-COO(EO)$_x$H, including mixtures thereof, wherein $R_n$ is a branched or unbranched alkyl chain, n being the number of carbon atoms in the alkyl chain which is from about 14 to about 26, EO represents an ethylene oxide unit, and x is from about 5 to about 12. In a preferred embodiment, on average $R_n$ is from about a $C_{16}$ to about $C_{20}$ alkyl chain, and x is from about 6 to about 10. Most preferably the compatibilizing agent comprises a $C_{18}$–$C_{20}$ fatty acid-initiated oxyethylate having an average of about 8 ethylene oxide units per molecule. Such compatibilizing agents are commercially available from BASF Corporation (Mt. Olive, N.J.) as INDUSTROL® TFA-8 or MAPEG® 400 MOT. BASF Corporation's MAPEG® 300 MOT is also a suitable compatibilizing agent.

Other suitable compatibilizing agents include the fatty alcohol ethoxylates having a limited portion of propylene oxide incorporated into the chemical structure as a heteric portion with the ethylene oxide in the compatibilizing agent structure, such as a $C_{12-15}(EO_{9.7}PO_{3.1})$ which is commercially available as PLURAFAC® B25-5 from BASF Corporation. The amount of propylene oxide should be limited to the extent that the above-described HLB values are met, the desired objective of manufacturing and dimensionally stable foam having good thermal insulation values, and optionally, solubilizing the blowing agent in the polyol composition can be achieved.

Although not intending to be bound by theory, it is believed that the predominant factors in influencing the effectiveness of the compatibilizing agent to facilitate the incorporation of the blowing agent into the polyester polyol composition include the chain length of the alkyl portion of the compatibilizing agent and the HLB of this component. Generally, longer fatty alkyl chain portions in the compatibilizing agent provided better capacity to solubilize the hydrocarbon blowing agent into the polyester polyol. The content of ethylene oxide in the chemical structure of the compatibilizing agent is generally proportional to its ability to solubilize the hydrocarbon blowing agent.

The amount of a compatibilizing agent required in the polyol composition of the present invention will depend largely on the components in the polyol composition particularly the polyester polyol component and the blowing agent utilized. The amount of the compatibilizing agent can be easily determined by one skilled in the art. Generally, though, a composition containing cyclopentane as the blowing agent will require less compatibilizing agent than compositions containing isopentane or normal pentane. Preferably, the compatibilizing agent is present in compositions containing cyclopentane as the blowing agent in an amount of from about 1 to about 25, more preferably from about 5 to about 15, most preferably from about 7 to about 10 parts by weight, based on 100 parts by weight of the polyester polyol in the polyol composition. In compositions containing isopentane or normal pentane as the blowing agent, the compatibilizing agent is preferably present in amount of from about 10 to 25, more preferably from 12 to about 22, most preferably from about 15 to about 20 parts by weight, based on 100 parts by weight of the polyester polyol in the polyol composition. In compositions containing 50/50 blends of cyclopentane and isopentane or normal pentane as the blowing agent, the compatibilizing agent will preferably be present in an amount of from about 5 to 20, more preferably from 5 to about 15, most preferably from about 8 to about 12 parts by weight, based on 100 parts by weight of the polyester polyol in the polyol composition.

At all effective levels of compatibilizing agent, preferably containing from about 1 to about 25 parts by weight of compatibilizing agent based on 100 parts by weight of the polyester polyol in the polyol composition, compositions of the present invention experience an improvement in the percentage of gas loss during the foaming process as compared to compositions containing no compatibilizing agent.

Catalysts may be employed which greatly accelerate the reaction of the compounds containing hydroxyl groups and with the modified or unmodified polyisocyanates. Examples of suitable compounds are cure catalysts which also function to shorten tack time, promote green strength, and prevent foam shrinkage. Suitable cure catalysts are organometallic catalysts, preferably organotin catalysts, although it is possible to employ metals such as lead, titanium, copper, mercury, cobalt, nickel, iron, vanadium, antimony, and manganese. Suitable organometallic catalysts, exemplified here by tin as the metal, are represented by the formula: $R_n$Sn $[X-R^1-Y]_2$, wherein R is a $C_1$–$C_8$ alkyl or aryl group, $R^1$ is a $C_0$–$C_{18}$ methylene group optionally substituted or branched with a $C_1$–$C_4$ alkyl group, Y is hydrogen or a hydroxyl group, preferably hydrogen, X is methylene, an —S—, an —SR²COO—, —SOOC—, an —O₃S—, or an —OOC— group wherein $R^2$ is a $C_1$–$C_4$ alkyl, n is 0 or 2, provided that $R^1$ is $C_0$ only when X is a methylene group. Specific examples are tin (II) acetate, tin (II) octanoate, tin (II) ethylhexanoate and tin (II) laurate; and dialkyl (1-8C) tin (IV) salts of organic carboxylic acids having 1–32 carbon atoms, preferably 1–20 carbon atoms, e.g., diethyltin diacetate, dibutyltin diacetate, dibutyltin diacetate, dibutyltin dilaurate, dibutyltin maleate, dihexyltin diacetate, and dioctyltin diacetate. Other suitable organotin catalysts are organotin alkoxides and mono or polyalkyl (1-8C) tin (IV) salts of inorganic compounds such as butyltin trichloride, dimethyl- and diethyl- and dibutyl- and dioctyl- and diphenyl- tin oxide, dibutydtin dibutoxide, di(2-ethylhexyl) tin oxide, dibutyltin dichloride, and dioctyltin dioxide. Preferred, however, are tin catalysts with tin-sulfur bonds which are resistant to hydrolysis, such as dialkyl (1-20C) tin dimercaptides, including dimethyl-, dibutyl-, and dioctyl- tin dimercaptides. A suitable catalyst in compositions of the present invention is K Hex Cem 977 which is a potassium octoate catalyst in a glycol (DPG) carrier commercially available from M & T Chemicals.

Tertiary amines also promote urethane linkage formation, and include triethylamine, 3-methoxypropyldimethylamine, triethylenediamine, tributylamine, dimethylbenzylamine, N-methyl-, N-ethyl- and N-cyclohexylmorpholine, N,N,N', N'-tetramethylethylenediamine, N,N,N',N'-tetramethylbutanediamin or -hexanediamine, N,N,N'-trimethyl isopropyl propylenediamine, pentamethyldiethylenetriamine, tetramethyldiaminoethyl ether, bis(dimethylaminopropyl)urea, dimethylpiperazine, 1-methyl-4-dimethylaminoethylpiperazine, 1,2-dimethylimidazole, 1,2-azabicylo [3.3.0]octane and preferably 1,4-diazabicylo[2.2.2]octane, and alkanolamine compounds, such as triethanolamine, trisopropanolamine, N-methyl- and N-ethyldiethanolamine and dimethylethanolamine.

To prepare the polyisocyanurate (PIR) and PUR-PIR foams by the process according to the invention, a polyisocyanurate catalyst is employed. Suitable polyisocyanurate catalysts are alkali salts, for example, sodium salts, preferably potassium salts and ammonium salts, of organic carboxylic acids, expediently having from 1 to 8 carbon atoms, preferably 1 or 2 carbon atoms, for example, the salts of formic acid, acetic acid, propionic acid, or octanoic acid, and tris(dialkylaminoethyl)-, tris(dimethylaminopropyl)-, tris (dimethylaminobutyl)- and the corresponding tris (diethylaminoalkyl)-s-hexahydrotriazines. However, (trimethyl-2-hydroxypropyl)ammonium formate, (trimethyl-2-hydroxypropyl)ammonium octanoate, potassium acetate, potassium octoate potassium formate and tris(dimethylaminopropyl)-s-hexahydrotriazine are polyisocyanurate catalysts which are generally used. The suitable polyisocyanurate catalyst is usually used in an amount of from 1 to 10 parts by weight, preferably from 1.5 to 8 parts by weight, based on 100 parts by weight of the total amount of polyols.

Urethane-containing foams may be prepared with or without the use of chain extenders and/or crosslinking agents, which are not necessary in this invention to achieve the desired mechanical hardness and dimensional stability. The chain extenders and/or crosslinking agents used have a number average molecular weight of less than 400, preferably from 60 to 300; or if the chain extenders have polyoxyalkylene groups, then having a number average molecular weight of less than 200. Examples are dialkylene glycols and aliphatic, cycloaliphatic and/or araliphatic diols having from 2 to 14 carbon atoms, preferably from 4 to 10 carbon atoms, e.g., ethylene glycol, 1,3-propanediol, 1,10-decanediol, o-, m-, and p-dihydroxycyclohexane, diethylene glycol, dipropylene glycol, and preferably 1,4-butanediol, 1,6-hexanediol, bis(2-hydroxyethyl)hydroquinone, triols such as 1,2,4- and 1,3,5-trihydroxycyclohexane, glycerol, and trimethylolpropane.

Polyurethane foams can also be prepared by using secondary aromatic diamines, primary aromatic diamines, 3,3'-di- and/or 3,3',5,5'-tetraalkyl-substituted diaminodiphenylmethanes as chain extenders or crosslinking agents instead of or mixed with the above-mentioned diols and/or triols.

The amount of chain extender, crosslinking agent or mixture thereof used, if any, is expediently from 2 to 20 percent by weight, preferably from 1 to 15 percent by weight, based on the weight of the polyol composition. However, as previously alluded to, it is preferred that no chain extender/crosslinker is used for the preparation of rigid foams since the polyether polyols described above are sufficient to provide the desired mechanical properties.

If desired, assistants and/or additives can be incorporated into the reaction mixture for the production of the cellular plastics by the polyisocyanate polyaddition process. Specific examples include surfactants, foam stabilizers, cell regulators, fillers, dyes, pigments, flame-proofing agents, hydrolysis-protection agents, and fungistatic and bacteriostatic substances.

Examples of suitable surfactants are compounds which serve to regulate the cell structure of the plastics by helping to control the cell size in the foam and reduce the surface tension during foaming via reaction of the polyol composition with an organic isocyanate as described herein.

Specific examples are salts of sulfonic acids, e.g., alkali metal salts or ammonium salts of dodecylbenzene- or dinaphthylmethanedisulfonic acid and ricinoleic acid; foam stabilizers, such as siloxane-oxyalkylene copolymers and other organopolysiloxanes, oxyethylated alkyl-phenols, oxyethylated fatty alcohols, paraffin oils, castor oil esters, ricinoleic acid esters, Turkey red oil and groundnut oil, and cell regulators, such as paraffins, fatty alcohols, and dimethylpolysiloxanes. Preferred surfactants include the silicone-containing surfactant polymers. The surfactants are usually used in amounts of 0.01 to 5 parts by weight, based on 100 parts by weight of the polyol component. A suitable surfactant in compositions of the present invention comprises Tegostab® B-8462 silicone surfactant commercially available from Goldschmidt Company.

For the purposes of the invention, fillers are conventional organic and inorganic fillers and reinforcing agents. Specific examples are inorganic fillers, such as silicate minerals, for example, phyllosilicates such as antigorite, serpentine, hornblends, amphiboles, chrysotile, and talc; metal oxides, such as kaolin, aluminum oxides, titanium oxides and iron oxides; metal salts, such as chalk, barite and inorganic pigments, such as cadmium sulfide, zinc sulfide and glass, inter alia; kaolin (china clay), aluminum silicate and co-precipitates of barium sulfate and aluminum silicate, and natural and synthetic fibrous minerals, such as wollastonite, metal, and glass fibers of various lengths. Examples of suitable organic fillers are carbon black, melamine, colophony, cyclopentadienyl resins, cellulose fibers, polyamide fibers, polyacrylonitrile fibers, polyurethane fibers, and polyester fibers based on aromatic and/or aliphatic dicarboxylic acid esters, and in particular, carbon fibers.

The inorganic and organic fillers may be used individually or as mixtures and may be introduced into the polyol composition or isocyanate side in amounts of from 0.5 to 40 percent by weight, based on the weight of components (the polyol composition and the isocyanate); but the content of mats, nonwovens and wovens made from natural and synthetic fibers may reach values of up to 80 percent by weight.

Examples of suitable flameproofing agents are tricresyl phosphate, tris(2-chloroethyl) phosphate, tris(2-chloropropyl) phosphate, and tris(2,3-dibromopropyl) phosphate. A suitable flame retardant in compositions of the present invention comprises FYROL® PCF, which is a tris(chloro propyl)phosphate commercially available from Albright & Wilson.

In addition to the above-mentioned halogen-substituted phosphates, it is also possible to use inorganic or organic flameproofing agents, such as red phosphorus, aluminum oxide hydrate, antimony trioxide, arsenic oxide, ammonium polyphosphate (Exolit®) and calcium sulfate, expandable graphite or cyanuric acid derivatives, e.g., melamine, or mixtures of two or more flameproofing agents, e.g., ammonium polyphosphates and melamine, and, if desired, corn starch, or ammonium polyphosphate, melamine, and expandable graphite and/or, if desired, aromatic polyesters, in order to flameproof the polyisocyanate polyaddition products. In general, from 2 to 50 parts by weight, preferably from 5 to 25 parts by weight, of said flameproofing agents may be used per 100 parts by weight of the polyol composition.

Further details on the other conventional assistants and additives mentioned above can be obtained from the specialist literature, for example, from the monograph by J. H. Saunders and K. C. Frisch, High Polymers, Volume XVI, Polyurethanes, Parts 1 and 2, Interscience Publishers 1962 and 1964, respectively, or Kunststoff-Handbuch, Polyurethane, Volume VII, Carl-Hanser-Verlag, Munich, Vienna, 1st and 2nd Editions, 1966 and 1983; incorporated herein by reference.

Suitable organic polyisocyanates, defined as having 2 or more isocyanate functionalities, are conventional aliphatic, cycloaliphatic, araliphatic and preferably aromatic isocyanates. Specific examples include: alkylene diisocyanates with 4 to 12 carbons in the alkylene radical such as 1,12-dodecane diisocyanate, 2-ethyl-1,4-tetramethylene diisocyanate, 2-methyl-1,5-pentamethylene diisocyanate, 1,4-tetramethylene diisocyanate and preferably 1,6-hexamethylene diisocyanate; cycloaliphatic diisocyanates such as 1,3- and 1,4-cyclohexane diisocyanate as well as any mixtures of these isomers, 1-isocyanato-3,3,5-trimethyl-5-isocyanatomethylcyclohexane (isophorone diisocyanate), 2,4- and 2,6-hexahydrotoluene diisocyanate as well as the corresponding isomeric mixtures, 4,4'- 2,2'-, and 2,4'-dicyclohexylmethane diisocyanate as well as the corresponding isomeric mixtures and preferably aromatic diisocyanates and polyisocyanates such as 2,4- and 2,6-toluene diisocyanate and the corresponding isomeric mixtures 4,4'-, 2,4'-, and 2,2'-diphenylmethane diisocyanate and the corresponding isomeric mixtures, mixtures of 4,4'-, 2,4'-, and 2,2-diphenylmethane diisocyanates and polyphenylenepolymethylene polyisocyanates (crude MDI), as well as mixtures of crude MDI and toluene diisocyanates. The organic di- and polyisocyanates can be used individually or in the form of mixtures. Particularly preferred for the production of rigid foams is crude MDI containing about 50 to 70 weight percent polyphenyl-polymethylene polyisocyanate and from 30 to 50 weight percent diphenylmethane diisocyanate, based on the weight of all polyisocyanates used.

Frequently, so-called modified multivalent isocyanates, i.e., products obtained by the partial chemical reaction of organic diisocyanates and/or polyisocyanates are used. Examples include diisocyanates and/or polyisocyanates containing ester groups, urea groups, biuret groups, allophanate groups, carbodiimide groups, isocyanurate groups, and/or urethane groups. Specific examples include organic, preferably aromatic, polyisocyanates containing urethane groups and having an NCO content of 33.6 to 15 weight percent, preferably 31 to 21 weight percent, based on the total weight, e.g., with low molecular weight diols, triols, dialkylene glycols, trialkylene glycols, or polyoxyalkylene glycols with a molecular weight of up to 6000; modified 4,4'-diphenylmethane diisocyanate or 2,4- and 2,6-toluene diisocyanate, where examples of di- and polyoxyalkylene glycols that may be used individually or as mixtures include diethylene glycol, dipropylene glycol, polyoxyethylene glycol, polyoxypropylene glycol, polyoxyethylene glycol, polyoxypropylene glycol, and polyoxypropylene polyoxyethylene glycols or -triols. Prepolymers containing NCO groups with an NCO content of 29 to 3.5 weight percent, preferably 21 to 14 weight percent, based on the total weight and produced from the polyester polyols and/or preferably polyether polyols described below; 4,4'-diphenylmethane diisocyanate, mixtures of 2,4'- and 4,4'-diphenylmethane diisocyanate, 2,4,- and/or 2,6-toluene diisocyanates or polymeric MDI are also suitable. Furthermore, liquid polyisocyanates containing carbodiimide groups having an NCO content of 33.6 to 15 weight percent, preferably 31 to 21 weight percent, based on the total weight, have also proven suitable, e.g., based on 4,4'- and 2,4'- and/or 2,2'-diphenylmethane diisocyanate and/or 2,4'- and/or 2,6-toluene diisocyanate. The modified polyisocyanates may optionally be mixed together or mixed with unmodified organic polyisocyanates such as 2,4'- and 4,4'-diphenylmethane diisocyanate, polymeric MDI, 2,4'- and/or 2,6-toluene diisocyanate.

The organic isocyanates used in the invention preferably have an average functionality of greater than 2, most preferably 2.5 or more. This provides for a greater crosslinking density in the resulting foam, which improves the dimensional stability of the foam.

To produce the rigid closed cell polyurethane foams of the present invention, the organic polyisocyanate and the isocyanate reactive compounds are reacted in such amounts that the isocyanate index, defined as the number of equivalents of NCO groups divided by the total number of isocyanate reactive hydrogen atom equivalents multiplied by 100, ranges from about 80 to less than about 150, preferably from about 90 to 110. The polyol composition of the invention provides flexibility in the processing window in that the solubility of the polyol composition and the dimensional stability and thermal insulation of the resulting foam are substantially unaffected throughout a wide range of isocyanate indices. If the rigid foams contain, at least in part, bonded isocyanurate groups, an isocyanate index of 150 to 6000, preferably from 200 to 800, is usually used.

In a method of the invention, there is provided the reaction of an organic isocyanate with a polyester polyol composition wherein the polyol composition comprises:
   a) a phthalic anhydride polyester polyol preferably having a hydroxyl number of 200 meq. polyol/g KOH or more.
   b) a blowing agent selected from the group consisting $C_4$–$C_6$ hydrocarbons and mixtures thereof; and
   c) an oxyethylated fatty acid or fatty alcohol compatibilizing agent having an HLB of from about 7 to about 12.

Optionally, but preferably, the hydrocarbon based blowing agent is dissolved in the polyol composition. In one embodiment, the polyol composition contains the blowing agent in solution prior to reaction with the organic isocyanate. Preferably, the organic isocyanate and the polyol composition are reacted at isocyanate indices ranging from 80 to 350. All throughout this range the K-factors of the foam are substantially constant and the foams are dimensionally stable. A substantially constant K-factor value means that the variance in values is ±10 percent or less between the lowest and highest values within the range. Throughout the range, the foam also remains dimensionally stable as defined below. The measurements for the K-factor are taken from core samples as described below in the definition of a dimensionally stable foam and are the initial K-factors.

The rigid foams made from polyisocyanate polyaddition products are advantageously produced by the one-shot process, for example, using reaction injection moldings, or the high pressure or low pressure method, in an open or closed mold, for example, in a metallic mold, or in a pour-in-place application where the surfaces contacting the reaction mixture become a part of the finished article. In a preferred embodiment, rigid foams may be made in a continuous laminate process, which process is well know in the industry.

The starting components may be mixed at from 15° C. to 90° C., preferably from 20° C. to 35° C., and introduced into the open or closed mold, if desired under super-atmospheric pressure. The mixing of the isocyanate with the polyol composition containing dissolved blowing agent can be carried out mechanically by means of a stirrer or a stirring screw or under high pressure by the impingement injection method. The mold temperature is expediently from 20° C. to 110° C., preferably from 30° C. to 60° C., in particular from 45° C. to 50° C.

The rigid foams produced by the process according to the invention and the corresponding structural foams are used, for example, in the vehicle industry—the automotive, aircraft, and ship building industries—and in the furniture and sports goods industries. They are particularly suitable in the construction and refrigeration sectors as thermal insulators, for example, as intermediate layers for laminate board or for foam-filling refrigerators, freezer housings, and picnic coolers.

For pour-in-place applications, the rigid foam may be poured or injected to form a sandwich structure of a first substrate/foam/second substrate or may be laminated over a substrate to form a substrate foam structure. The first and second substrate may each be independently made of the same material or of different materials, depending upon the end use. Suitable substrate materials comprise metal such as aluminum, tin, or formed sheet metal such as used in the case of refrigeration cabinets; wood, including composite wood; acrylonitrile-butadiene-styrene (ABS) triblock of rubber, optionally modified with styrene-butadiene diblock, styrene-ethylene/butylene-styrene triblock, optionally functionalized with maleic anhydride and/or maleic acid, polyethylene terephthalate, polycarbonate, polyacetals, rubber modified high impact polystyrene (HIPS), blends of HIPS with polyphenylene oxide, copolymers of ethylene and vinyl acetate, ethylene and acrylic acid, ethylene and vinyl alcohol, homopolymers or copolymers of ethylene and propylene such as polypropylene, high density polyethylene, high molecular weight high density polyethylene, polyvinyl chloride, nylon 66, or amorphous thermoplastic polyesters. Preferred are aluminum, tin, ABS, HIPS, polyethylene, and high density polyethylene.

The polyurethane foam may be contiguous to and bonded to the inner surfaces of the first and second substrates, or the polyurethane foam may be contiguous to a layer or lamina of synthetic material interposed between the substrates. Thus, the sequence of layers in the composite may also comprise a first substrate/polyurethane foam/layer or lamina/second substrate or first substrate/layer or lamina/polyurethane foam/layer or lamina/second substrate.

The layer or lamina of layers additionally interposed into the composite may comprise any one of the above-mentioned synthetic resins which have good elongation such as low density polyethylene or low density linear polyethylene as a stress relief layer or a material which promotes adhesion between the polyurethane foam and the first and/or second substrate of choice.

When a synthetic plastic material such as polyethylene having few or no bonding or adhesion sites is chosen as the first and/or second substrate as an alternative to an adhesion-promoting layer, it is useful to first modify the substrate surface with a corona discharge or with a flame treatment to improve adhesion to the polyurethane foam.

During the foam-in-place operation, the substrates are fixed apart in a spaced relationship to define a cavity between the first substrate and second substrate, and optionally the inner surface of at least one substrate, preferably both, treated to promote adhesion. This cavity is then filled with a liquid polyurethane system which reacts and foams in situ, bonding to the inner surfaces of the first and second substrates. In the case of a refrigeration unit or a cooler container, such as a picnic cooler, a thermoformed inner liner material is inserted into the outer shell of cooler or the refrigeration cabinet, in a nested spaced relationship to define a cavity, which cavity is then filled with a foamed-in-place polyurethane foam. In many cases, it is only the polyurethane foam which holds together the outer shell and inner liner, underscoring the need for foam dimensional stability.

The polyurethane cellular products of the invention are rigid, meaning that the ratio of tensile strength to compressive strength is high, on the order of 0.5:1 or greater, and having less than 10 percent elongation. The foams are also closed cell, meaning that the number of open cells is 20% or less, or conversely the number of closed cells is 80% or greater, the measurement being taken on a molded foam packed at 10% over the theoretical amount required to fill the mold with foam.

The rigid polyurethane cellular products of the invention are dimensionally stable, exhibiting little or no shrinkage, even at free rise densities of 2.0 pcf or less. In a preferred embodiment, the rigid polyurethane cellular products of the invention tested according to ASTM D 2126-87 using core samples of density 2.0 pcf or less with dimensions of 3"×3"×1" and taken from a 10% packed boxes measuring 4"×10"×10" advantageously have the following dimensional changes at 28 days of exposure: at 100 F/100 percent RH, i.e., relative humidity, no more than ±5 percent, more preferably no more than ±3 percent; at 158 F./100 percent RH no more than ±5 percent, most preferably less than ±4 percent; at 158 F., dry no more than ±8 percent, preferably no more than ±6 percent; at 200 F., dry no more than ±5, preferably no more than ±3 percent; and at −20 F. after 7 days exposure no more than ±5 percent, preferably no more than ±3 percent.

The thermal insulation values of the rigid closed cell foams according to the preferred embodiments of the invention are 0.160 BTU-in./hr.-ft$^2$-F or less initial, more preferably 0.150 or less initial, measured from the core of a 10% overpacked sample. It has been found that foams made with the phthalic-anhydride-initiated polyester polyols exhibit relatively low k-factors.

In a preferred embodiment, the rigid polyurethane foams are also advantageously not friable at their surface in spite of their low density and the presence of polyols having a high hydroxyl number and low equivalent weight. These foams typically exhibit a surface friability of less than 5 percent when tested according to ASTM C 421, at core densities of 2.0 pcf or less, even at core densities of 1.5 pcf or less. The low surface friability enables the foam to adhere well to substrates.

The term polyisocyanate based foam as used herein is meant to include polyurethane-polyurea, polyurethane-polyisocyanurate, polyurethane, and polyisocyanurate foams.

The following examples illustrate the nature of the invention with regard to the formation of stable polyester polyol compositions and the resulting isocyanate-based rigid foam prepared therefrom. The examples presented herein are intended to demonstrate the objects of the invention but should not be considered as limitations thereto. Unless otherwise indicated, all parts are expressed in parts by weight.

EXAMPLES

Isocyanate A is a polymethylene polyphenylene polyisocyanate having a free NCO content of about 31 percent, a nominal functionality of about 3 and a viscosity of 700 cP at 25° C.

Polyester Polyol is a phthalic anhydride-initiated polyester polyol having a nominal functionality of about 2 and hydroxyl number of about 240.

Flame Retardant is a tris(chloro propyl)phosphate.

Surfactant is a silicone surfactant polymer.

Catalyst is a potassium octoate catalyst in a dipropylene glycol carrier.

Compatibilizer is a long chain fatty acid initiated oxyethylate having on average about 8 ethylene oxide units per molecule and an HLB of about 10.

Commercial cyclopentane is a product containing between about 80 and 85% cyclopentane isomer which is commercially available from Phillips 66 Company.

Pure cyclopentane is a high purity reagant grade cyclopentane product commercially available from Exxon Corporation containing greater than about 90% cyclopentane isomer.

Procedure for Resin Blend

The amount of polyester polyol is weighed and placed into a glass bottle. The desired quantity of surfactant, catalyst, compatiblizer and flame retardant are added into the glass bottle container. Generally, the components may be added in any order. The desired amount of hydrocarbon blowing agent is dispensed into the glass container. The contents are sealed by tightening the cap on the bottle. The contents are then mixed by vigorously shaking the bottle. The contents are allowed to remain at rest for 5 days at room temperature without agitation. If upon visual inspection there is no phase separation (clear resin blend) such that two discrete layers are formed, the blowing agent is deemed soluble in the polyol composition, and the polyol composition is deemed storage stable.

Procedure for production of Polyurethane Foam

The polyol composition is then reacted with an amount of Isocyanate A at a foam index ratio of 300 such that the calculated ratio of NCO groups in the isocyanate is three times the number of hydroxyl groups in the resin components. The isocyanate is mixed and reacted with the resin blend at about room temperature using a high speed propeller mixer. Gas loss for these handmixes is determined according to the following procedure.

Procedure for gas loss determination

Supplies required: polypropylene tubs (approximately 8" in diameter and 10" in height) with ½" drain tubes located about ½" below the open rim of the tub; laboratory balance; barometer; thermometer; water; and foam mixing equipment (high speed propeller mixer). Place a polypropylene tub on the laboratory balance and tare the balance. Fill the polypropylene tub with water above the drain tube and allow it to drain until draining stops. Record the water weight needed to fill the tub. Record the water temperature. Repeat at least ten times and calculate the average water weight needed to fill the tub. Empty the water from the tub and dry it out. Coat the inside of the tub with a release agent, such as paste wax to ease removal of foam. Place the tub on the balance and tare the balance. Mix a foam handmix using normal laboratory technique. Pour approximately 200 grams of mixed foam into a polypropylene tub and immediately record the weight of the foam before it starts to rise. Note: Exact weights are not critical in this operation, speed is. Dump the foam quickly into the tub and read the weight of the liquid on the balance as quickly as possible. Allow the foam to rise in the tub. Note: The foam should not rise above the level of the drain tube. After several minutes, the foam weight will stabilize. Record this value. Tare the balance to zero. Fill the tub with water above the drain tube and allow it to drain until it stops. Record the weight of the water in the tub. Record the water temperature. Remove foam from the tub. Measure and record the barometric pressure, the ambient air temperature and the wet bulb

TABLE 1

| Component | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| Polyester Polyol | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| Flame Retardant | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |
| Surfactant | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| Catalyst | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| Compatibilizer | 0.0 | 5.0 | 0.0 | 5.0 | 0.0 | 5.0 | 10.0 | 15.0 | 20.0 | 0.0 | 5.0 | 10.0 | 15.0 | 20.0 | 0.0 | 5.0 | 10.0 | 0.0 | 0.0 | 10.0 |
| COMMERCIAL CYCLO-PENTANE | 25.0 | 25.0 | — | — | — | — | — | — | — | — | — | — | — | — | — | — | — | — | — | — |
| PURE CYCLO-PENTANE | — | — | 25.0 | 25.0 | — | — | — | — | — | — | — | — | — | — | — | — | — | — | — | — |
| ISOPENTANE (IP) | — | — | — | — | 25.0 | 25.0 | 25.0 | 25.0 | 25.0 | — | — | — | — | — | — | — | — | — | — | — |
| NORMAL PENTANE (NP) | — | — | — | — | — | — | — | — | — | 25.0 | 25.0 | 25.0 | — | 25.0 | — | — | — | — | — | — |
| CP/IP BLEND 50/50 | — | — | — | — | — | — | — | — | — | — | — | — | — | — | 25.0 | 25.0 | 25.0 | — | — | — |
| CP/NP BLEND 50/50 | — | — | — | — | — | — | — | — | — | — | — | — | — | — | — | — | — | 25.0 | 25.0 | 25.0 |
| TOTAL: | 139.5 | 144.5 | 139.5 | 144.5 | 139.5 | 144.5 | 149.5 | 154.5 | 159.5 | 139.5 | 144.5 | 149.5 | 154.5 | 159.5 | 139.5 | 144.5 | 149.5 | 139.5 | 144.5 | 149.5 |
| CLEAR RESIN BLEND | YES | YES | YES | YES | NO | NO | NO | NO | YES | NO | NO | NO | NO | YES | NO | NO | YES | NO | NO | YES |

Blowing Agent Loss = $Wt_{liquid\ foam} - Wt_{cured\ foam} - Density_{ambient\ air}[Wt_{total\ water} - Wt_{partial\ water}]/(Density_{water} \times 1000)]$ where: $Density_{ambient\ air} = (MW_{ambient\ air} \times Bar.Press.)/1.362833(Temp._{dry\ bulb} + 460)$ $MW_{ambient\ air} = (28.94 \times Dry\ Mole\ Fraction) + (0.18 \times Absolute\ Moisture_{ambient\ air})$ Dry Mole Fraction = $1 - (Absolute\ Moisture_{ambient\ air}/100)$ Absolute Moisture$_{ambient\ air}$ = $[Vap.Press._{water\ @\ wet\ bulb\ temp.} - (3.67 \times 10^{-2})(Bar.Press.)(Temp._{dry\ bulb} - Temp._{wet\ bulb})[1 + (Temp._{wet\ bulb} - 32)/1571]]/Bar.Press.$ temperature. Calculate the gas loss for each foam using the equations appearing below Table 1.

Results

Samples 2; and 4; and 6–9; and 11–14; and 16–17; and 19–20 exhibit an improvement in percentage of gas loss during the process of producing a polyurethane foam over Samples 1; and 3; and 5; and 10; and 15; and 18, respectively. Further, Table 1 demonstrates the approximate level of compatibilizing agent required for the compositions displayed using different blowing agents to provide a storage stable polyester polyol composition in accordance with the present invention.

What is claimed is:

1. A process for producing an isocyanate-based rigid foam comprising reacting:
   a) an organic and/or modified organic polyisocyanate with
   b) a polyol composition
      wherein said polyol composition comprises at least 75% by weight of a phthalic anhydride-initiated polyester polyol, a compatibilizing agent having an HLB of from about 7 to about 12 and selected from the group consisting of fatty alcohol ethyoxylates having a general formula of $C_n(EO)_x(PO)_y$, wherein n is from 10 to 20, EO represents ethylene oxide units and x is from 3 to 10, and PO represents propylene oxide units and y is from 0 to 3, oxyethylated fatty acids having a general formula of $R_nCOO(EO)_xH$, wherein $R_n$ is a $C_{14}$ to a $C_{26}$ alkyl chain, EO represents ethylene oxide units and x is from 5 to 12, and mixtures thereof, and a blowing agent selected from the group consisting of $C_4$–$C_6$ hydrocarbons and mixtures thereof, and, optionally, a relatively low molecular weight chain extender or crosslinker, a surfactant, a catalyst and further auxiliaries and/or additives, wherein said blowing agent is soluble in the polyol composition for at least 5 days.

2. A process as defined in claim 1, wherein the compatibilizing agent comprises a $C_{18}$–$C_{20}$ fatty acid initiated oxyethylate having an average of about 8 ethylene oxide units per molecule.

3. A process as defined in claim 1, wherein the compatibilizing agent is present in an amount of from about 1.0 to about 25.0 parts by weight based on 100 parts by weight of the polyester polyol.

4. A process as defined in claim 1, wherein the compatibilizing agent is present in an amount of from about 5.0 to about 15.0 parts by weight based on 100 parts by weight of the polyester polyol.

5. A process as defined in claim 2, wherein the compatibilizing agent is present in an amount of from about 5.0 to about 15.0 parts by weight based on 100 parts by weight of the polyester polyol.

6. A process as defined in claim 1, wherein the amount of blowing agent is at least 5.0 parts by weight based on 100 parts by weight of the polyester polyol.

7. A process as defined in claim 1, wherein said blowing agent is selected from the group consisting of isopentane, normal pentane, neopentane, cyclopentane and mixtures thereof.

8. A process as defined in claim 1 wherein the blowing agent further comprises water in an amount of from about 0.05 to 4 parts by weight based on 100 parts by weight of the polyester polyol.

9. A process as defined in claim 1 wherein the polyol composition further comprises aromatic or aliphatic amine initiated polyoxyalkylene polyether polyols or polyester polyols other than the phthalic anhydride initiated polyester polyol in an amount of less than 20.0 weight percent based on the weight of all polyol components in the polyol composition.

10. A process as defined in claim 1 wherein the polyol composition further comprises assistants and/or additives.

11. A process for producing an isocyanate-based rigid foam comprising reacting:
    a) an organic and/or modified organic polyisocyanate with
    b) a polyol composition
       wherein said polyol composition comprises at least 75% by weight of a phthalic anhydride-initiated polyester polyol, a compatibilizing agent having an HLB of from about 7 to 12 and selected from the group consisting of fatty alcohol ethyoxylates having a general formula of $C_n(EO)_x(PO)_y$, wherein n is from 10 to 20, EO represents ethylene oxide units and x is from 3 to 10, and PO represents propylene oxide units and y is from 0 to 3, oxyethylated fatty acids having a general formula of $R_nCOO(EO)_xH$, wherein $R_n$ is a $C_{14}$ to a $C_{26}$ alkyl chain, EO represents ethylene oxide units and x is from 5 to 12, and mixtures thereof, and a blowing agent comprising a $C_5$ hydrocarbon, and, optionally, a relatively low molecular weight chain extender or crosslinker, a surfactant, a catalyst and further auxiliaries and/or additives, wherein said blowing agent is soluble in the polyol composition for at least 5 days.

12. A process as defined in claim 11, wherein the compatibilizing agent comprises a $C_{18}$–$C_{20}$ fatty acid initiated oxyethylate having an average of about 8 ethylene oxide units per molecule.

13. A process as defined in claim 11, wherein the compatibilizing agent is present in an amount of from about 1.0 to about 25.0 parts by weight based on 100 parts by weight of the polyester polyol.

14. A process as defined in claim 11, wherein the compatibilizing agent is present in an amount of from about 5.0 to about 15.0 parts by weight based on 100 parts by weight of the polyester polyol.

15. A process as defined in claim 12, wherein the compatibilizing agent is present in an amount of from about 5.0 to about 15.0 parts by weight based on 100 parts by weight of the polyester polyol.

16. A process as defined in claim 11, wherein the blowing agent comprises a mixture of isopentane and/or normal pentane and cyclopentane.

17. A process as defined in claim 11, wherein the amount of blowing agent is at least 5.0 parts by weight based on 100 parts by weight of the polyester polyol.

18. A process as defined in claim 11 further comprising water in an amount of from about 0.05 to 4 parts by weight based on 100 parts by weight of the polyester polyol.

19. A process for producing an isocyanate-based rigid foam comprising reacting:
    a) an organic and/or modified organic polyisocyanate with
    b) a polyol composition
       wherein said polyol composition comprises at least 75% by weight of a phthalic anhydride-initiated polyester polyol, a compatibilizing agent comprising a $C_{18}$–$C_{20}$ fatty acid-initiated oxyethylate having an average of about 8 ethylene oxide units per molecule and having an HLB of about 10, and a blowing agent comprising isopentane and cyclopentane in a weight ratio of from about 30:70 to about 40:60, and, optionally, a relatively low molecular weight chain extender or crosslinker, a surfactant, a catalyst and further auxiliaries and/or additives, wherein said blowing agent is soluble in the polyol composition for at least 5 days.

* * * * *